United States Patent [19]

VanNatter, III et al.

[11] Patent Number: 5,553,570

[45] Date of Patent: Sep. 10, 1996

[54] DISC-SHAPED ANIMAL RETRIEVAL TOY HAVING TREAT CONTAINER

[76] Inventors: Charlie H. VanNatter, III, Rte. 1 Box 1925, Pearland, Tex. 77584; Guy L. McClung, III, 16690 Champion Forest Dr. Suite 347, Houston, Tex. 77068

[21] Appl. No.: 338,675

[22] Filed: Nov. 14, 1994

[51] Int. Cl.⁶ ................................................. A01K 29/00
[52] U.S. Cl. ........................... 119/709; 119/51.01; 446/5; 446/46
[58] Field of Search ................... 119/51.03, 707, 119/709, 710, 711, 5; 446/46, 47, 48, 219

[56] References Cited

U.S. PATENT DOCUMENTS

| Re. 34,352 | 8/1993 | Markham et al. | 119/710 |
|---|---|---|---|
| D. 209,526 | 12/1967 | Dunbar | D34/15 |
| D. 343,262 | 1/1994 | Axelrod | D30/160 |
| 1,006,182 | 10/1911 | Cousin | 119/711 |
| 1,022,112 | 4/1912 | Smith | 119/711 |
| 2,499,483 | 3/1950 | Foy | 446/219 |
| 2,988,045 | 6/1961 | Fisher . | |
| 3,123,047 | 3/1964 | Fisher . | |
| 3,359,678 | 12/1967 | Headrick . | |
| 3,441,001 | 4/1969 | Fisher . | |
| 3,871,334 | 3/1975 | Axelrod . | |
| 4,023,805 | 5/1977 | Sherill | 446/46 |
| 4,145,839 | 3/1979 | Sampietro | 446/47 |
| 4,207,702 | 6/1980 | Boatman et al. | 446/48 |
| 4,212,460 | 7/1980 | Kraft | 446/125 |
| 4,364,926 | 12/1982 | Yokogawa et al. | 424/50 |
| 4,513,014 | 4/1985 | Edwards | 426/132 |
| 4,557,219 | 12/1985 | Edwards . | |
| 4,563,160 | 1/1986 | Lee | 446/47 |
| 4,674,444 | 6/1987 | Axelrod . | |
| 4,712,510 | 12/1987 | Tae-Ho . | |
| 4,802,444 | 2/1989 | Markham et al. . | |
| 4,919,083 | 4/1990 | Axelrod | 119/710 |
| 4,928,632 | 5/1990 | Gordon . | |
| 5,009,193 | 4/1991 | Gordon | 119/707 |
| 5,078,097 | 1/1992 | Chisholm | 119/51.13 |
| 5,139,945 | 8/1992 | Israel | 446/219 |
| 5,263,436 | 11/1993 | Axelrod | 119/710 |
| 5,277,641 | 1/1994 | Gable et al. | 446/48 |
| 5,339,771 | 8/1994 | Axelrod | 119/710 |
| 5,343,828 | 9/1994 | Houghton et al. | 119/709 |
| 5,358,440 | 10/1994 | Zheng | 446/48 |
| 5,390,629 | 2/1995 | Simone | 119/711 |

FOREIGN PATENT DOCUMENTS 1445019  8/1976  United Kingdom .................. 119/709

OTHER PUBLICATIONS

PTO Official Gazette, 19 Jul. 1994, entry for U.S. Patent 5,329,881.
PTO Official Gazette, 23 Aug. 1994, entry for U.S. Patent 5,340,347.
"R. C. Steele Wholesale Pet Equipment and Kennel Supplies," R. C. Steele Co., particularly pp. 3–5, pages Holiday 4, pp. 53, 67–71 and back cover.

*Primary Examiner*—Todd E. Manahan
*Attorney, Agent, or Firm*—Guy McClung

[57] ABSTRACT

A retrievable animal toy has been developed which, in one aspect, has a two-part body at least one part of which has at least one hollow portion for holding an item, an animal food item or items and which is not accessible by an animal until released therefrom. One embodiment has a transparent portion, or body so the animal can see the item within the toy. In certain aspects the toy is shaped like a bone; like a creature, e.g. but not limited to a bird or a mouse; or like a plate or throwable toy like a Frisbee™ device.

1 Claim, 4 Drawing Sheets

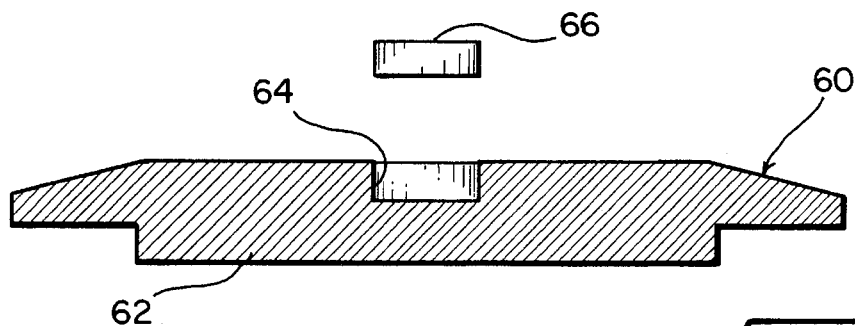
FIG. 4A
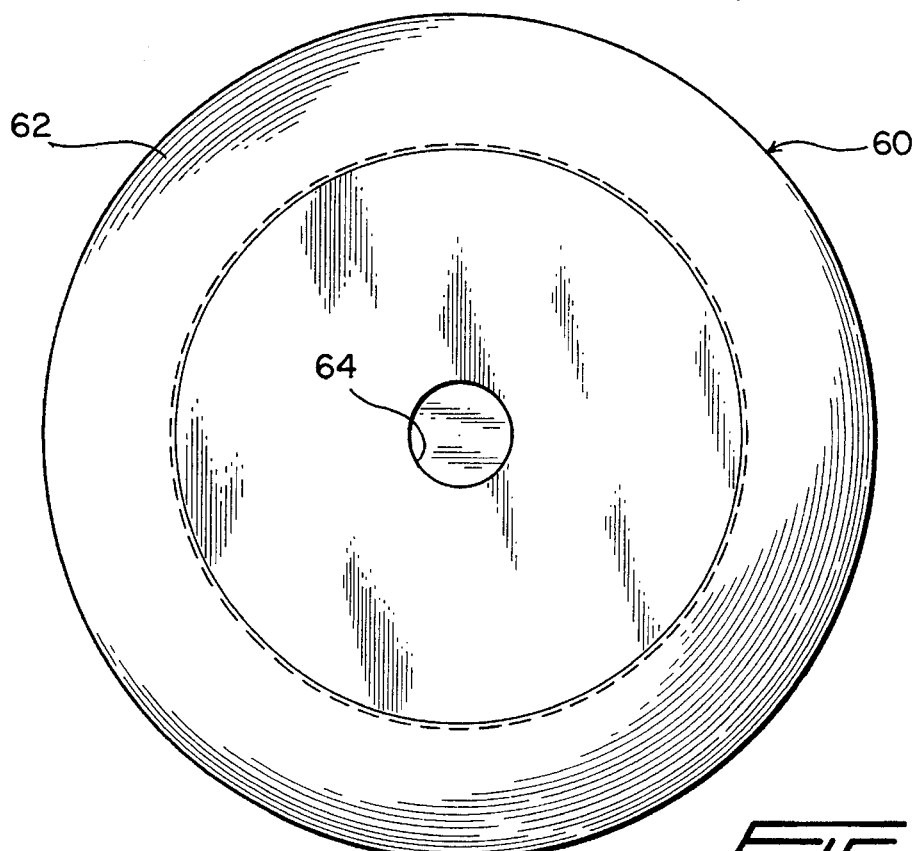
FIG. 4B
   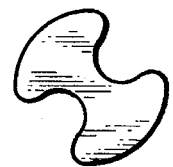   
FIG. 4C      FIG. 4D      FIG. 4E

DISC-SHAPED ANIMAL RETRIEVAL TOY HAVING TREAT CONTAINER

BACKGROUND OF THE INVENTION

1. Field of the Invention

This invention is directed to animal toys and, in one aspect, to a toy on or in which a smaller toy or item, or treat or food substance is emplaceable.

2. Description of Related Art

The prior art reveals a variety of retrieval devices for playing with animals and for teaching them various behaviors, including such things as chewable toys, plastic bones, artificial animals, and Frisbee™ devices. U.S. Pat. No. 5,329,880 discloses a dog chew toy made from a length of rope impregnated with a therapeutic dental agent that is released onto a dog's teeth. U.S. Pat. No. 5,263,436 discloses a bone-shaped therapeutic device for dogs which is made from a hard, tough material with protruding spikes that scrape tartar and plaque from a dog's teeth as he chews the device. A design for such a device is disclosed in U.S. Pat. No. Des. 343,262. U.S. Pat. No. 4,802,444 (and U.S. Pat. No. Re. 34,352) discloses a therapeutic pet toy with an elastomer body with grooves sized for receiving a dog's teeth to scrape plaque and debris from the teeth. U.S. Pat. No. 4,712,510 discloses a stuffed pet toy at the end of a tether secured to a telescoping wand. U.S. Pat. Nos. 4,557,219 and 4,513,014 disclose a chewable animal toy made from super-tough molded elastomeric material with a surface-migrating flavoring material and a groove which facilitates flexing of the toy. U.S. Pat. No. 5,078,097 discloses an automatic food dispensing device for pets with a plurality of interior areas for holding and from which food is dispensed. U.S. Pat. No. 1,111,111 discloses an animal chewable toy with animal mean pieces disposed therein. U.S. Pat. Nos. 5,340,347; 3,359,678; and Des. 209,526 disclose flying toys which are generally saucer-shaped.

SUMMARY OF THE PRESENT INVENTION

The present invention in one embodiment discloses a toy retrievable by an animal such as a dog or cat, the toy having a body with two joined yet releasable parts, one or both of which have a hollow portion therein or a holding device thereon for holding an item, animal treat, or food item and for preventing the animal from having access to the item until a person opens the body or releases the item from a holding device.

In one embodiment the body of the toy either has a portion of one part which is transparent or the entire part is transparent so that an animal can see a food treat, an item, or a picture within the body. Another embodiment according to the present invention includes a food item or items in a transparent wrapper or container which is held to or on the body. In one such embodiment an interior mirror is emplaced at a location in the toy so that it is viewable from the toy's exterior.

In one embodiment the two parts of the body have mating threads so the parts are screwable together. In another embodiment two parts are held together with a friction fit and/or a snap fit. In certain embodiments the body is shaped like a bone, or like a small animal that a larger animal would eat. In another embodiment the body is shaped as a flying toy plate or Frisbee™ device. In one aspect such a device is solid with an interior chamber or recess for holding an item, a treat, or food item.

In one embodiment the present invention discloses a series of devices as disclosed above of different colors and/or with different indicia (e.g. letters, symbols, or numbers thereon). In one method according to this invention for using such devices an item, a treat or food item is placed in only one of the devices and an animal (or person) is asked to retrieve that device according to its indicia from among a plurality of devices.

In another embodiment the body has a pocket or other container therein or thereon for holding a card or photograph.

Other embodiments include one, more, or any combination of all of the features listed above.

In another aspect a toy according to this invention has releasably secured thereto a container, envelope, or package with a food item therein, e.g. a piece of cheese, meat, dog food, cat food or candy; and in one aspect the container, envelope or package is transparent or has a transparent portion which reveals to an animal retrieving the toy or to a human being observing or using the toy the contents thereof. In one aspect a photograph or pictorial representation or other indicia is on a photograph or card emplaced in the container, envelope, or package. In one aspect a releasable adhesive material is used, either on the container etc., on a surface of the toy, or both, to hold the container etc. in place as the toy is used and/or thrown. In another aspect releasably cooperating material, e.g. Velcro™ material, is used to secure the container etc. to the toy.

It is, therefore, an object of at least certain preferred embodiments of the present invention to provide:

New, useful, unique, efficient, nonobvious animal toys which hold a treat food item or other item therein or thereon;

Such devices with a transparent portion or apparatus for revealing the food item or other item;

Such devices with two securable but separable parts; and

Methods for using such devices for play and for education with animals or human beings.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 4A is a side cross-sectional view of a flying retrieval toy according to the present invention.

FIG. 4B is a top view of the toy of FIG. 4A.

FIGS. 4C and 4D show a top view of a food treat or item according to the present invention.

FIG. 4E shows a side view of a food treat or item according to the present invention.

DESCRIPTION OF EMBODIMENTS PREFERRED AT THE TIME OF FILING FOR THIS PATENT

Figure 1A:
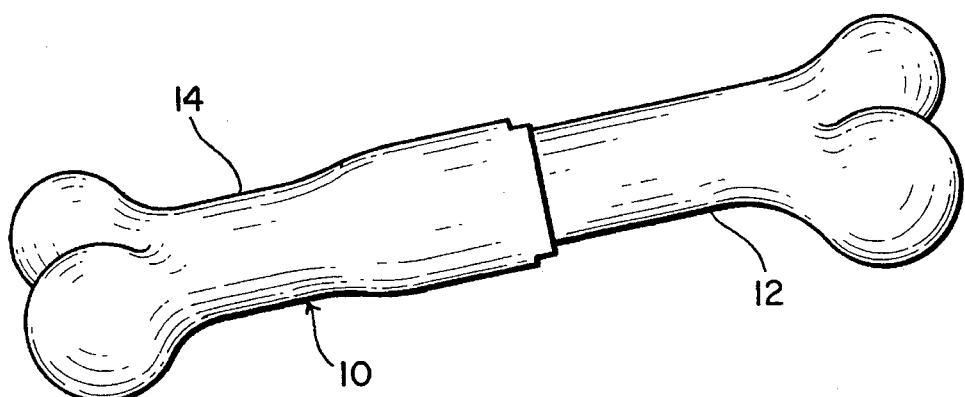
FIG. 1A is a perspective view of an artificial dog bone according to the present invention.
Figure 1B:
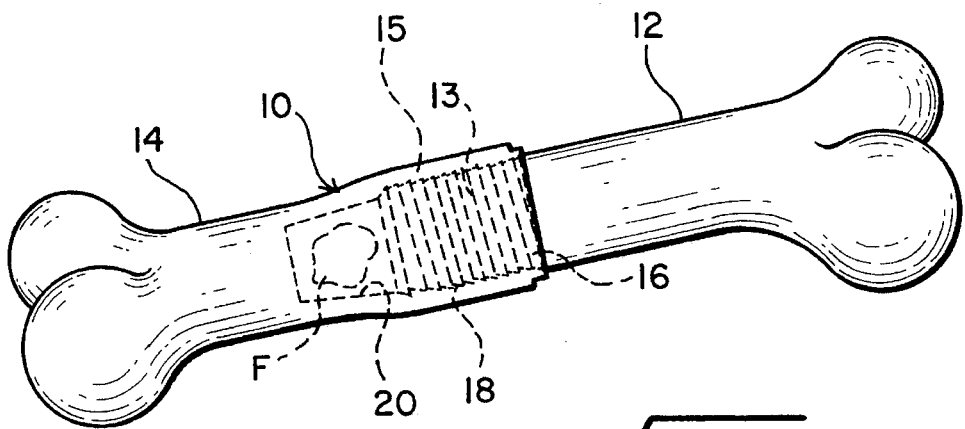
FIG. 1B is a cross-sectional view of the bone of FIG. 1A.

FIGS. 1A and 1B show a retrieval device 10 according to the present invention which is generally shaped like a bone. The device 10 has two releasably separable parts 12 and 14 which are releasably secured together with exterior threads 16 or an end 13 of the part 12 and interior threads 18 on an end 15 of the part 14. A treat or food item F is removably confined in an interior chamber 20 of the part 14. After an animal retrieves the device 10, a person unscrews the two parts 12 and 14 and either removes the item F and gives it to the animal as a reward or lets the item F roll out from the interior chamber 20.

Figure 1C:
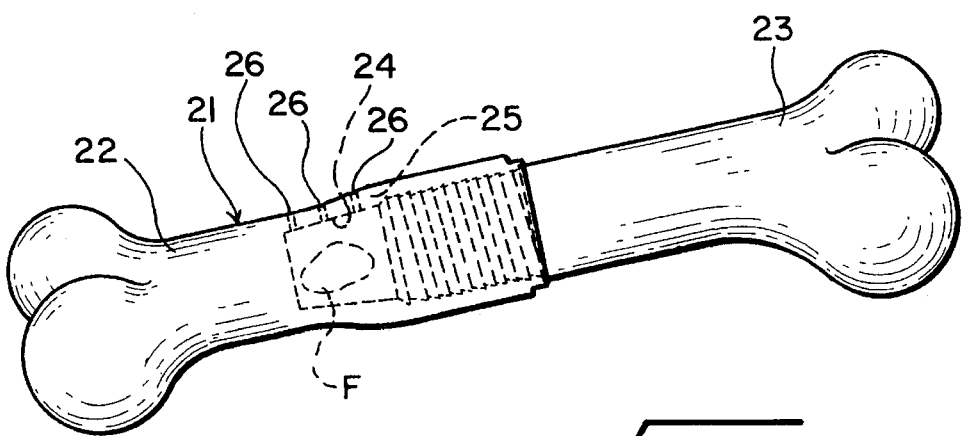
FIG. 1C is a cross-sectional view of another embodiment of a bone according to the present invention which is similar to the bone of FIG. 1A.

A device 21 according to the present invention is shown in FIG. 1C which is similar to the device 10 of FIG. 1A. The same numerals in FIGS. 1A and 1C indicate the same structure. An end 22 of the device 21 is releasably securable to an end 23. A treat or food item F is disposed in an interior chamber 24 formed in the part 22. A transparent piece 25 over all or a portion of the chamber 24 permits visual access to the item F while it is in the chamber 24. Optionally one or more vent holes 26 serve as air holes and/or permit an aroma from the item F to escape from the chamber 20 to further interest an animal in retrieving the device 21 and/or to provide a sensory indicator of the location of the device 21, e.g. if it is hidden in tall grass or under water. A mirror M is viewable through the transparent piece 25. A transparent piece 25 may be used with any embodiment of the present invention disclosed or described herein.

Figure 2:
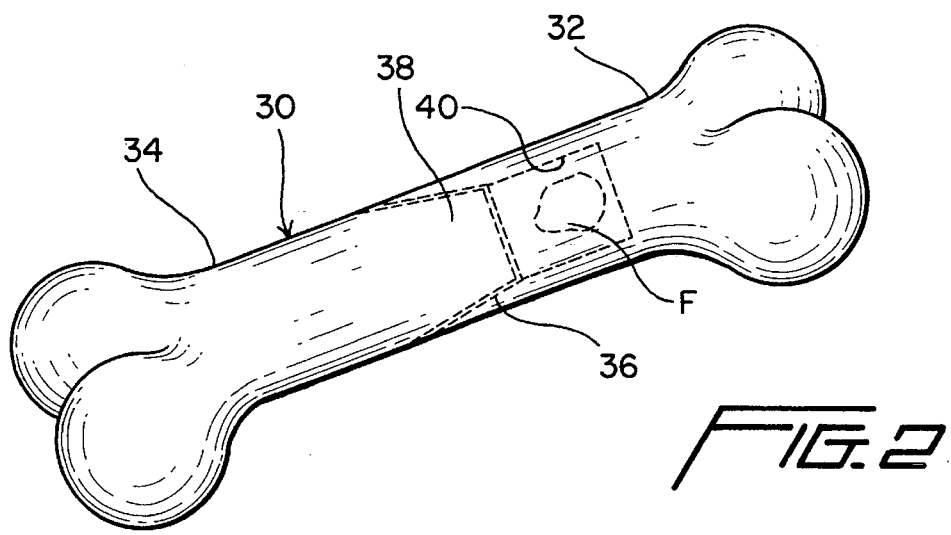
FIG. 2 is a perspective view of an artificial dog bone according to the present invention with interior aspects shown with dotted lines.

FIG. 2 illustrates a device 30 according to the present invention which has two parts 32 and 34 releasably secured together by a friction fit between an end 38 of the part 34 and an end 36 of the part 32. A treat, food item, or other item F is disposed in an interior chamber 40 of the part 32. Known snap-fit mechanisms (not shown) may be used with the two ends 36 and 38 for further securement of the two parts.

Figure 3A:
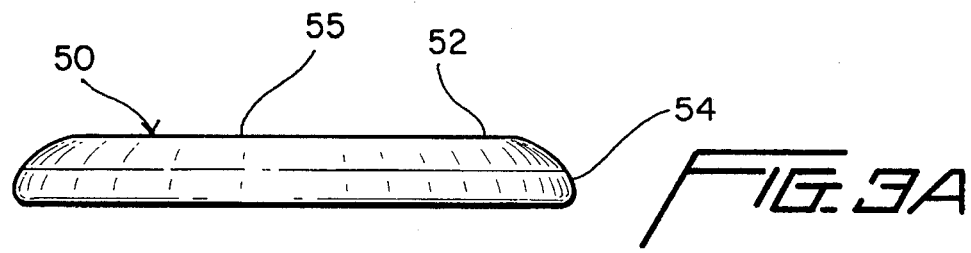
FIG. 3A is a side view of a flying retrieval toy according to the present invention.
Figure 3B:
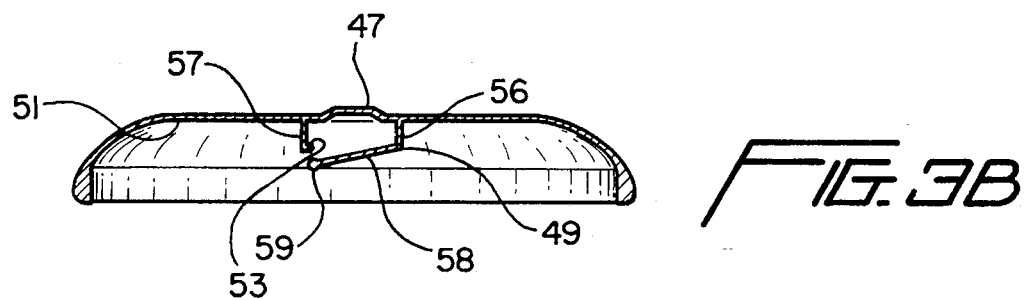
FIG. 3B is a side cross-sectional view of the toy of FIG. 3A.
Figure 3C:
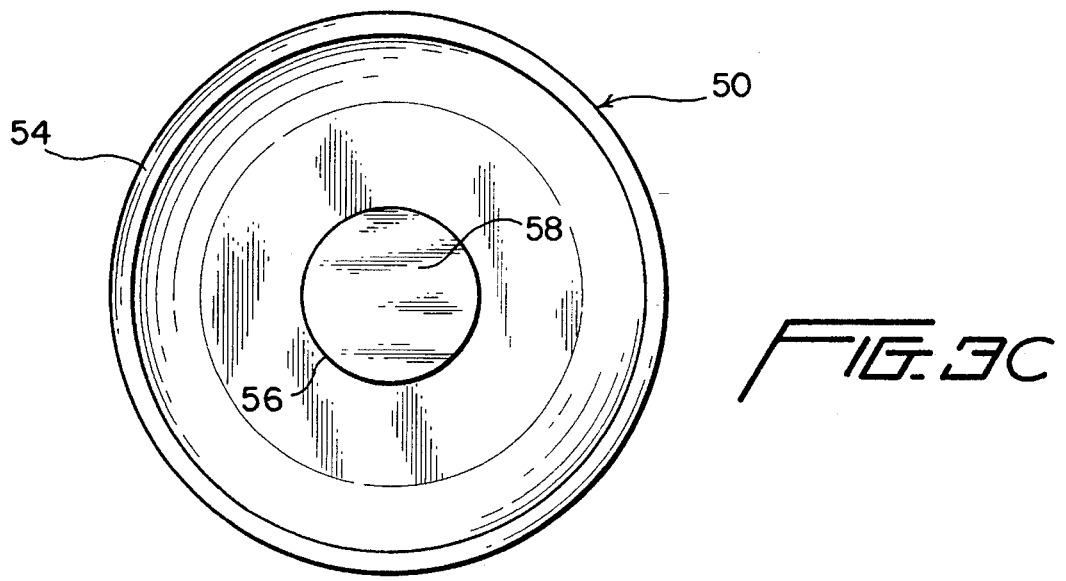
FIG. 3C is a bottom view of the toy of FIG. 3A.

FIGS. 3A–3C show a generally plate-shaped flying retrieval toy 50 according to the present invention which has a body 52 with a top surface 55 and a lateral edge 54. A container 56 is secured to or formed of a bottom surface 51 of the body 52. An item F is removably emplaceable in the container 56. The container 56 may be releasably secured to the bottom surface 51 with a suitable adhesive, mechanical structure (e.g. a clip), or releasably cooperating fastener (e.g. VELCRO™ material). The container 56 has a sidewall 57 and a hinged lid 58 connected, e.g. with a living hinge 49 to the side wall 57. The lid 58 may be releasably securable to the side wall 57 with a snap-fit structure that includes, e.g. a bead 59 on the lid 58 and a bead recess 53 on the side wall 57. Alternatively the lid 58 may be releasably received and held within the interior periphery of the side wall 57. A portion 47 of the body 52 may be transparent.; alternatively any device according to this invention may be made entirely of transparent material.

FIGS. 4A and 4B show a generally plate-shaped flying retrieval toy 60 according to the present invention that has a main body 62 with a recess 64 therein for receiving and holding a treat, food item, or other item 66. In one aspect, proper sizing of the recess 64 and item 66 results in a friction fit of the item 66 in the recess 64 rendering it difficult or impossible for an animal to remove the item 66 from the recess 64. Indentation(s), hole(s) or a raised portion on the item 66 will facilitate removal from the recess 64 by a person. A recess such as the recess 64 may be positioned anywhere in the body 62 and two or more such recesses may be used on the same or different sides of the body 62. FIG. 4D shows a food treat or item 61, like the item 66, but with an indentation 63 to facilitate handling and removal from a recess. FIG. 4E shows a food treat or item 65, like the treat 61, but with two indentations 67. FIG. 4E shows a food treat or item 69 with a raised portion 59 to facilitate handling and removal from a recess. Although the items 61, 65, and 69 are shows as generally cylindrical, they may be any shape or configuration usable with a recess of any suitable shape or configuration, e.g. but not limited to cone-shaped, cubic, etc.

Figure 5A:
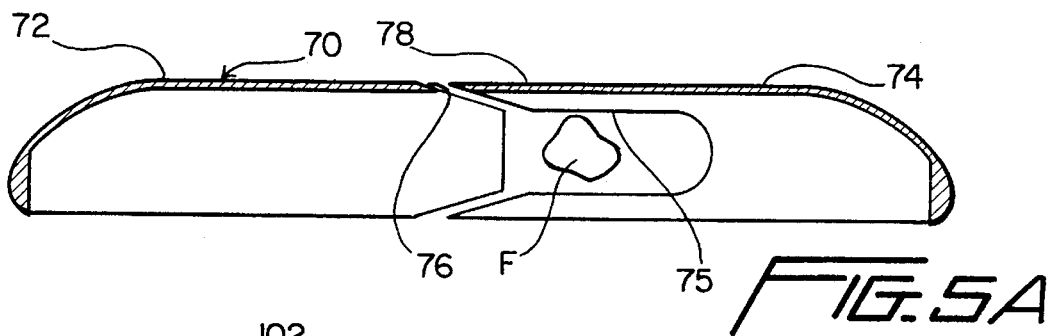
FIG. 5 is a side cross-sectional view of a flying retrieval toy according to the present invention.
Figure 5B:
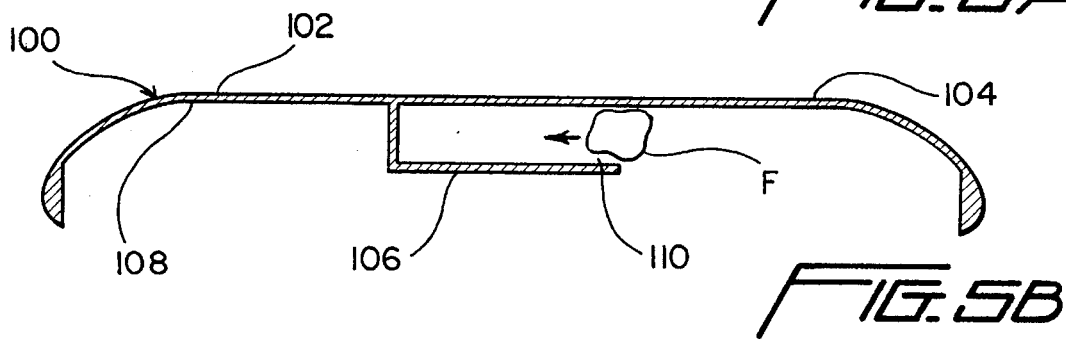

FIGS. 5A and 5B show a flying retrieval toy 70 according to the present invention which has two parts 72 and 74 releasably held together by a friction fit of an end 76 of the part 72 held within an end 78 of the part 74 to form a generally plate-shaped plate member. An item F is held in an interior chamber 75 of the part 74.

Figure 6A:
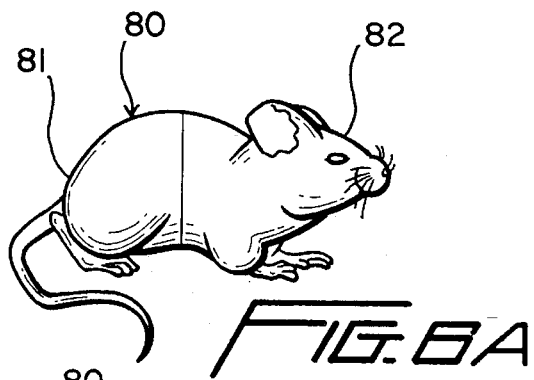
FIG. 6A shows a perspective view of an artificial mouse toy according to the present invention.
Figure 6B:
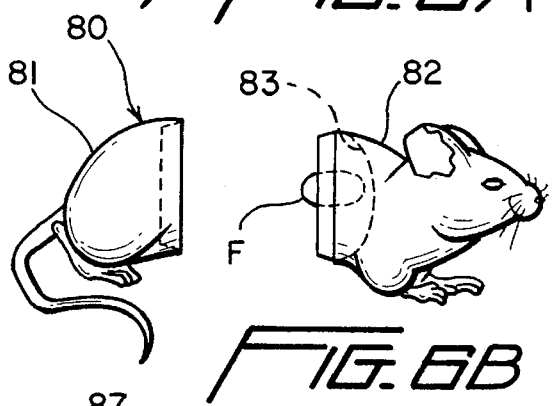
FIG. 6B shows an exploded view, partially in cross-section, of the mouse of FIG. 6A.
Figure 6C:
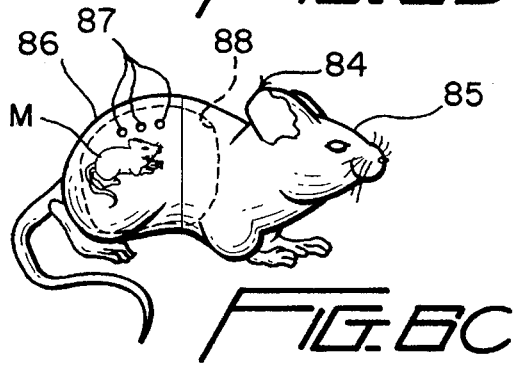
FIG. 6C shows an artificial mouse toy according to the present invention.

For particular animals a retrieval toy according to the present invention may be made to look like another creature which a particular animal eats. For example, FIGS. 6A and 6B show an artificial mouse 80 according to the present invention which is attractive to cats which has two releasably securable parts 81 and 82 with an interior chamber 83 for holding an item F. FIG. 6C shows an artificial mouse 84 with two releasably secured parts 85 and 86. Part 86 has air holes 87. A smaller artificial mouse or live mouse S is disposed in an inner chamber 88 of the mouse 84. The mouse 84 is made of transparent plastic so the live mouse may be seen.

Figure 7A:
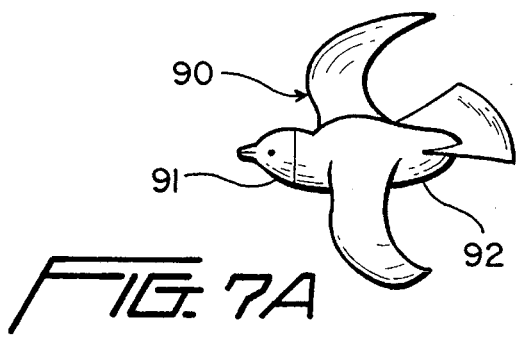
FIG. 7A shows a perspective view of an artificial mouse toy according to the present invention.
Figure 7B:
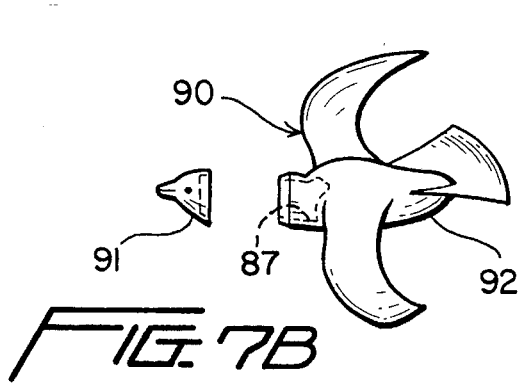
FIG. 7B shows an exploded view, partially in cross-section, of the mouse of FIG. 6A.
Figure 7C:
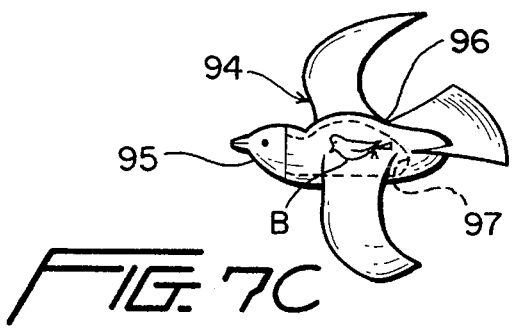
FIG. 7C shows an artificial mouse toy according to the present invention.

FIGS. 7A and 7B show an artificial bird 90 with two releasably securable pans 91 and 92 with an interior chamber 87 for holding a food treat or other item. FIG. 7C shows an artificial bird 84 with two releasably secured parts 85 and 86. Part 86 has air holes 87. A smaller artificial bird or live bird B is disposed in an inner chamber 88 of the bird 84. The bird 84 is made of transparent plastic so the live bird may be seen. It is within the scope of this invention to provide a body of any animal shape with a smaller artificial or live animal therein, or to insert therein any of the items or treats previously described herein. With respect to those embodiments shown from only one side in the drawings, the other side is a mirror image of the side shown.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized.

What is claimed is:

1. A flying retrievable animal toy for use with an animal, the toy comprising:

a body plate with a top body plate surface and a bottom body plate surface, a container on the bottom body plate surface for releasably holding a food item, the container comprising a sidewall extending downwardly from the bottom body plate surface, the sidewall having a lower edge defining a container opening of the container through which the food item is movable, and a hinged lid movably connected to the sidewall and the hinged lid releasably securable to the side wall to selectively close off the container opening.

* * * * *